(12) United States Patent
Klode

(10) Patent No.: US 12,512,739 B2
(45) Date of Patent: Dec. 30, 2025

(54) BRUSHLESS MOTOR WITH INTEGRATED POSITION SENSOR

(71) Applicant: Goodrich Corporation, Charlotte, NC (US)

(72) Inventor: Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 266 days.

(21) Appl. No.: 18/323,811

(22) Filed: May 25, 2023

(65) Prior Publication Data

US 2024/0396417 A1 Nov. 28, 2024

(51) Int. Cl.
*H02K 29/08* (2006.01)
*H02K 1/2706* (2022.01)
*H02K 29/03* (2006.01)

(52) U.S. Cl.
CPC .......... *H02K 29/08* (2013.01); *H02K 1/2706* (2013.01); *H02K 29/03* (2013.01)

(58) Field of Classification Search
CPC ........ H02K 29/03; H02K 29/06; H02K 29/08; H02K 29/12; H02K 11/21; H02K 11/215; H02K 11/22; H02K 1/2706
See application file for complete search history.

(56) References Cited

U.S. PATENT DOCUMENTS

| | | | |
|---|---|---|---|
| 8,110,953 B2 | 2/2012 | Ferrari et al. | |
| 8,450,893 B2 | 5/2013 | Miyazaki et al. | |
| 9,509,195 B1 | 11/2016 | Edsinger et al. | |
| 9,929,627 B2 | 3/2018 | Klode et al. | |
| 10,131,332 B1 | 11/2018 | Mastrocola et al. | |
| 10,305,358 B2 * | 5/2019 | Benner, Jr. | H02K 11/21 |
| 10,833,555 B2 | 11/2020 | Ahn | |
| 2005/0113216 A1 * | 5/2005 | Cheng | H02K 7/1016 482/4 |
| 2014/0070643 A1 * | 3/2014 | Motoishi | H02K 11/05 310/64 |
| 2016/0190898 A1 * | 6/2016 | Yamashita | H02K 11/225 310/68 B |
| 2019/0031170 A1 * | 1/2019 | Mastrocola | B64C 25/44 |
| 2020/0269825 A1 | 8/2020 | Stauder et al. | |

OTHER PUBLICATIONS

European Patent Office, European Search Report dated Dec. 4, 2024 in Application No. 24176380.4.

* cited by examiner

*Primary Examiner* — Christopher M Koehler
*Assistant Examiner* — Ahmed F Seck
(74) *Attorney, Agent, or Firm* — SNELL & WILMER L.L.P.

(57) ABSTRACT

A brushless motor with integrated position sensor is provided. The brushless motor includes a motor housing, a stator assembly positioned on an inside outer circumference of the motor housing, a rotor assembly positioned within and surrounded by the stator assembly, and a position sensor integrated within the rotor assembly.

15 Claims, 5 Drawing Sheets

BRUSHLESS MOTOR WITH INTEGRATED POSITION SENSOR

FIELD

The present disclosure relates generally to brushless motors and, more particularly, to a brushless motor with integrated position sensor.

BACKGROUND

Brushless motors typically include rotor position feedback to deliver enhanced performance. The position feedback is typically provided via a position sensor (e.g., a resolver) that is externally attached to the brushless motor housing, thereby increasing the length of the brushless motor. In aerospace applications, an increase in length of a brushless motor may be impermissible or undesirable since the increase in length may compromise the available packaging space, increase weight, and result in a less competitive product.

SUMMARY

According to various embodiments of the present disclosure, a brushless motor with integrated position sensor is provided. The brushless motor includes a motor housing, a stator assembly positioned on an inside outer circumference of the motor housing, a rotor assembly positioned within and surrounded by the stator assembly, and a position sensor integrated within the rotor assembly.

In various embodiments, the rotor assembly includes a hollow housing defining a void in which the position sensor is located. In various embodiments, the position sensor includes a set of rotating position sensor windings positioned within and coupled to an inside diameter of the hollow portion of the rotor assembly and the set of rotating position sensor windings that rotate with the rotor assembly. In various embodiments, the position sensor includes a stationary position sensor shaft positioned within and surrounded by the set of rotating position sensor windings.

In various embodiments, the position sensor includes a set of stationary position sensor windings coupled to an outside diameter of the stationary position sensor shaft. In various embodiments, the stationary position sensor shaft is hollow, and communication leads from the set of stationary position sensor windings are routed through the hollow portion of the stationary position sensor shaft in order to provide rotor position feedback.

In various embodiments, a first end of the stationary position sensor shaft is configured to be positioned within a position sensor bearing, the position sensor bearing rotates with the rotor assembly and around the first end of the stationary position sensor shaft. In various embodiments, a second end of the stationary position sensor shaft protrudes through a partially closed end of the rotor assembly and couples to an end plate of the motor housing.

In various embodiments, the stationary position sensor shaft may be tuned by adjusting the end plate of the motor housing.

Also disclosed herein is a brake assembly, the brake assembly includes a plurality of rotating discs, a plurality of stators with each of the plurality of stators positioned between two of the plurality of rotating discs, a pressure plate configured to apply pressure forcing the plurality of rotating discs and the plurality of stators together; and a brushless motor configured to apply a pressure to the pressure plate so that the pressure plate forces the plurality of rotating discs and the plurality of stators together. The brushless motor includes a motor housing, a stator assembly positioned on an inside outer circumference of the motor housing, a rotor assembly positioned within and surrounded by the stator assembly, and a position sensor integrated within the rotor assembly.

In various embodiments, the rotor assembly includes a hollow housing defining a void in which the position sensor is located. In various embodiments, the position sensor includes a set of rotating position sensor windings positioned within and coupled to an inside diameter of the hollow portion of the rotor assembly and the set of rotating position sensor windings that rotate with the rotor assembly. In various embodiments, the position sensor includes a stationary position sensor shaft positioned within and surrounded by the set of rotating position sensor windings.

In various embodiments, the position sensor includes a set of stationary position sensor windings coupled to an outside diameter of the stationary position sensor shaft. In various embodiments, the stationary position sensor shaft is hollow, and communication leads from the set of stationary position sensor windings are routed through the hollow portion of the stationary position sensor shaft in order to provide rotor position feedback.

In various embodiments, a first end of the stationary position sensor shaft is configured to be positioned within a position sensor bearing, the position sensor bearing rotates with the rotor assembly and around the first end of the stationary position sensor shaft. In various embodiments, a second end of the stationary position sensor shaft protrudes through a partially closed end of the rotor assembly and couples to an end plate of the motor housing.

In various embodiments, the stationary position sensor shaft may be tuned by adjusting the end plate of the motor housing.

Also disclosed herein is an aircraft including a brake assembly. The brake assembly includes a plurality of rotating discs, a plurality of stators with each of the plurality of stators positioned between two of the plurality of rotating discs, a pressure plate configured to apply pressure forcing the plurality of rotating discs and the plurality of stators together; and a brushless motor configured to apply a pressure to the pressure plate so that the pressure plate forces the plurality of rotating discs and the plurality of stators together. The brushless motor includes a motor housing, a stator assembly positioned on an inside outer circumference of the motor housing, a rotor assembly positioned within and surrounded by the stator assembly, and a position sensor integrated within the rotor assembly.

In various embodiments, the rotor assembly includes a hollow housing defining a void in which the position sensor is located.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, brushless motors typically include rotor position feedback to deliver enhanced performance. The position feedback is typically provided via a resolver that is externally attached to the brushless motor housing, thereby increasing the length of the brushless motor. In aerospace applications, an increase in length of a brushless motor may be impermissible or undesirable since the increase in length may compromise the available packaging space, increase weight, and result in a less competitive product.

Disclosed herein is a brushless motor with integrated position sensor. In various embodiments, the length of the brushless motor is reduced by locating the position sensor inside the brushless motor's rotor core. In various embodiments, the rotor core is hollowed by removing material that is not needed to carry magnetic flux. In various embodiments, the position sensor's rotating windings are coupled to an inside of the core and the position sensor's stationary windings are attached to a stationary hollow shaft. In various embodiments, the stationary hollow shaft is stabilized inside the core via a bearing. In various embodiments, the stationary hollow shaft protrudes through the brushless motor's hollow upper shaft portion. In various embodiments, the position sensor's communication leads are routed through the stationary hollow shaft and a top motor bearing. In various embodiments, the stationary hollow shaft is coupled to an end plate of the brushless motor. In various embodiments, the end plate may be configured to be adjusted to allow for tuning of the position sensor.

Figure 1A:
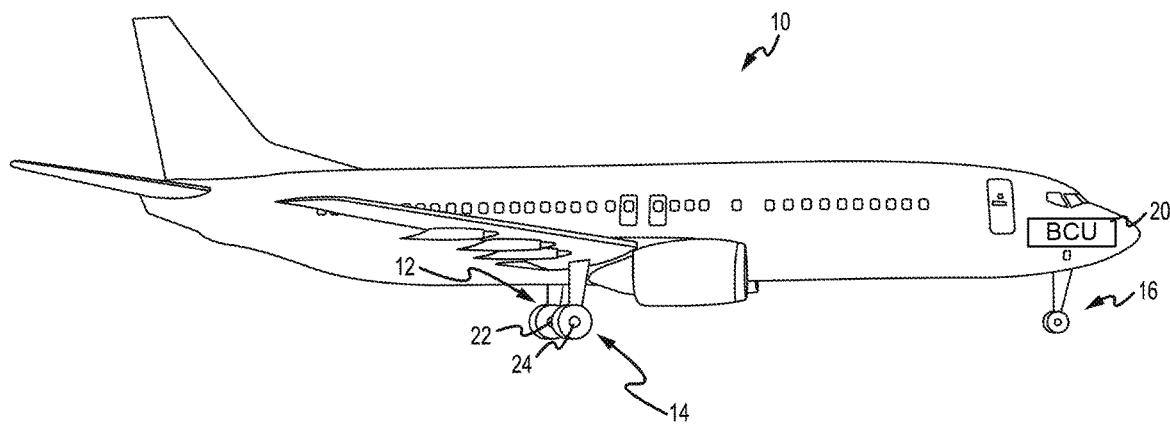
FIG. 1A illustrates an aircraft having a brake system, in accordance with various embodiments.
Figure 1A:
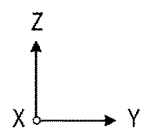

Referring to FIG. 1A, in accordance with various embodiments, an aircraft 10 is illustrated. The aircraft 10 includes a landing gear, which may include a left main landing gear 12, a right main landing gear 14 and a nose landing gear 16. The landing gear support the aircraft 10 when it is not flying, allowing the aircraft 10 to taxi, take off, and land without damage. While the disclosure refers to the three landing gear configurations just referred, the disclosure nevertheless contemplates any number of landing gear configurations.

Aircraft 10 may further include a brake control unit (BCU) 20 for controlling a left main brake mechanism 22 of left main landing gear 12 and a right main brake mechanism 24 of right main landing gear 14. BCU 20 controls the application of brake mechanisms 22, 24 in response to input from aircraft 10 or an authorized user. BCU 20 further controls a parking brake functionality of brake mechanisms 22, 24 to secure aircraft 10 in place. A plurality of wires that independently control the braking and parking brake functionalities run through aircraft 10 from BCU 20 to left main brake mechanism 22 and right main brake mechanism 24.

Figure 1B:
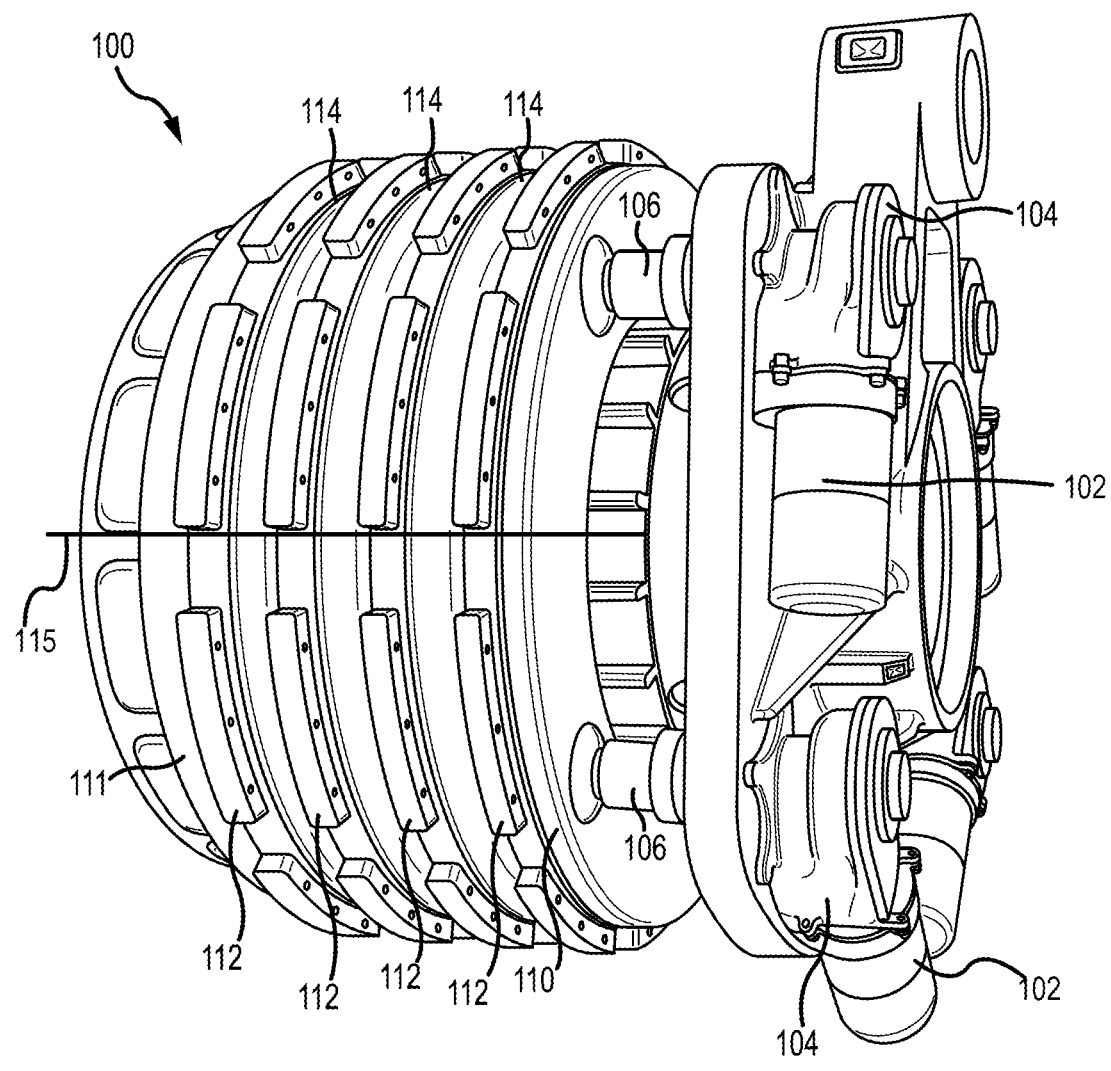
FIG. 1B illustrates an aircraft brake, in accordance with various embodiments.

Referring to FIG. 1B, an aircraft brake assembly 100 in accordance with various embodiments is illustrated. Aircraft brake assembly 100 may include a plurality of actuator motors 102, a plurality of electromechanical brake actuators 104, a plurality of ball screws 106, an end plate 111 and a pressure plate 110, and a plurality of rotating discs 112 and a plurality of stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

In order to exert this force onto pressure plate 110, actuator motor 102 may cause electromechanical brake actuator 104 to actuate. Although referred to herein as electromechanical brake actuator 104, it is contemplated that, in various embodiments, electromechanical brake actuator 104 may be an electrohydraulic actuator. In various embodiments, actuator motor 102 may be a brushless motor, such as a permanent magnet synchronous motor (PMSM), a permanent-magnet motor (PMM) or the like. In various embodiments, electromechanical brake actuator 104 may be coupled to or otherwise operate a motor shaft and a pressure generating device, such as, for example, a ball screw, a ram, and/or the like. In response to actuation or a brake command, electromechanical brake actuator 104 causes the motor shaft to rotate. Rotation of the motor shaft may cause rotation of a ball screw, and rotational motion of the ball screw may be transformed into linear motion of a ball nut. Linear translation of a ball nut towards pressure plate 110 applies force on pressure plate 110 towards end plate 111. Electromechanical brake actuator 104 is actuated in response to current being applied to actuator motor 102. The amount of force applied by electromechanical brake actuator 104 is related to the amount of current applied to actuator motor 102.

Figure 2:
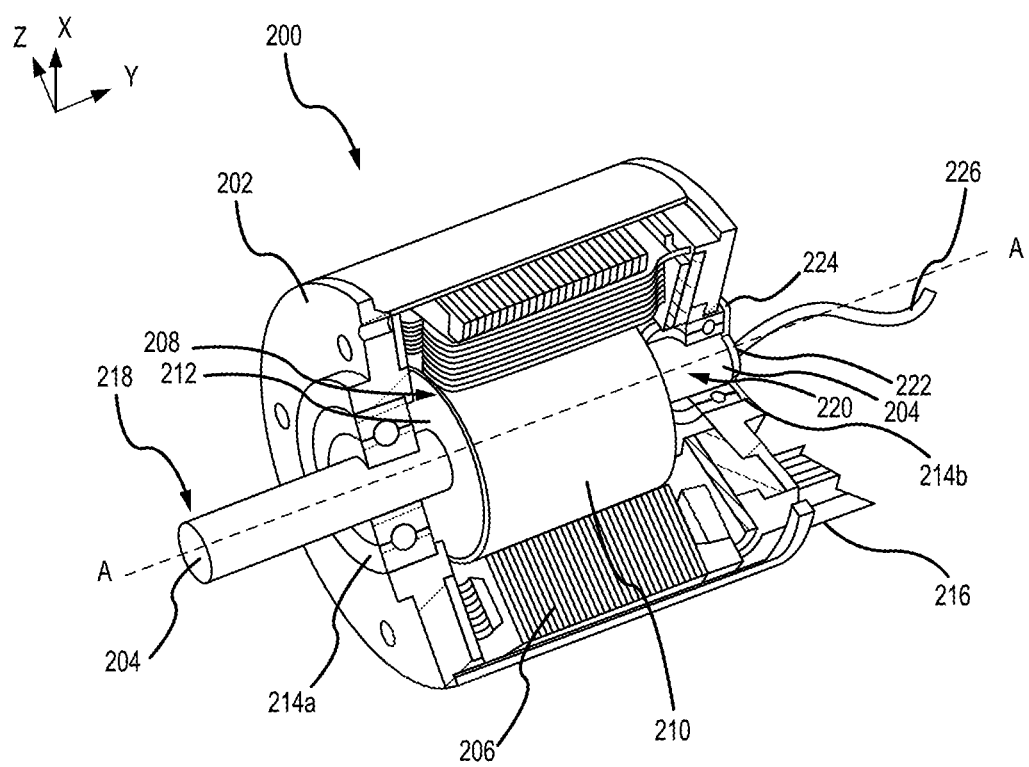
FIG. 2 illustrates an isometric view of a brushless motor, in accordance with various embodiments.

Referring to FIG. 2, in accordance with various embodiments, an isometric view of a brushless motor, such as actuator motor 102 of FIG. 1B, is illustrated. In various embodiments, brushless motor 200 includes a motor housing 202 and a motor shaft 204. In various embodiments, a stator assembly 206 is a non-moving portion of the brushless motor 200 that is mounted on an inside of an outer circumference of the motor housing 202 surrounding the rotor assembly 208. In various embodiments, the rotor assembly 208 is a moving portion of the brushless motor 200 that includes a rotor magnet assembly 210 surrounding a rotor core 212. In various embodiments, the rotor core 212 is coupled to the motor shaft 204, In various embodiments, the motor shaft 204 and the rotor assembly 208 are held in position within the stator assembly 206 via a first bearing 214a and a second bearing 214b. In various embodiments, the first bearing 214a and the second bearing 214b allow the motor shaft 204 to rotate in a clockwise or counterclockwise direction about axis A inside the stator assembly 206. In various embodiments, the stator assembly 206 may be powered and controlled by motor power/control wiring 216.

Figure 3A:
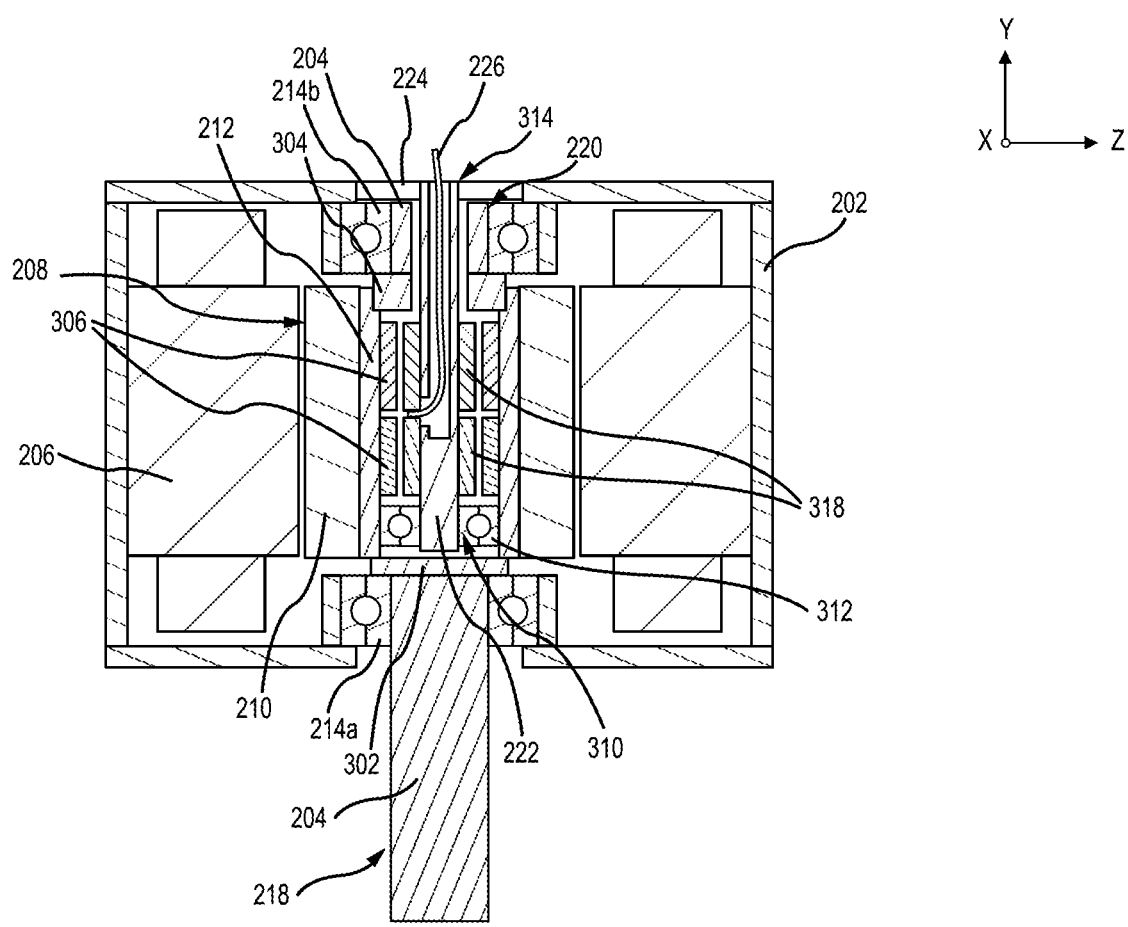
FIG. 3A illustrates a cross section view of a brushless motor, in accordance with various embodiments.
Figure 3B:
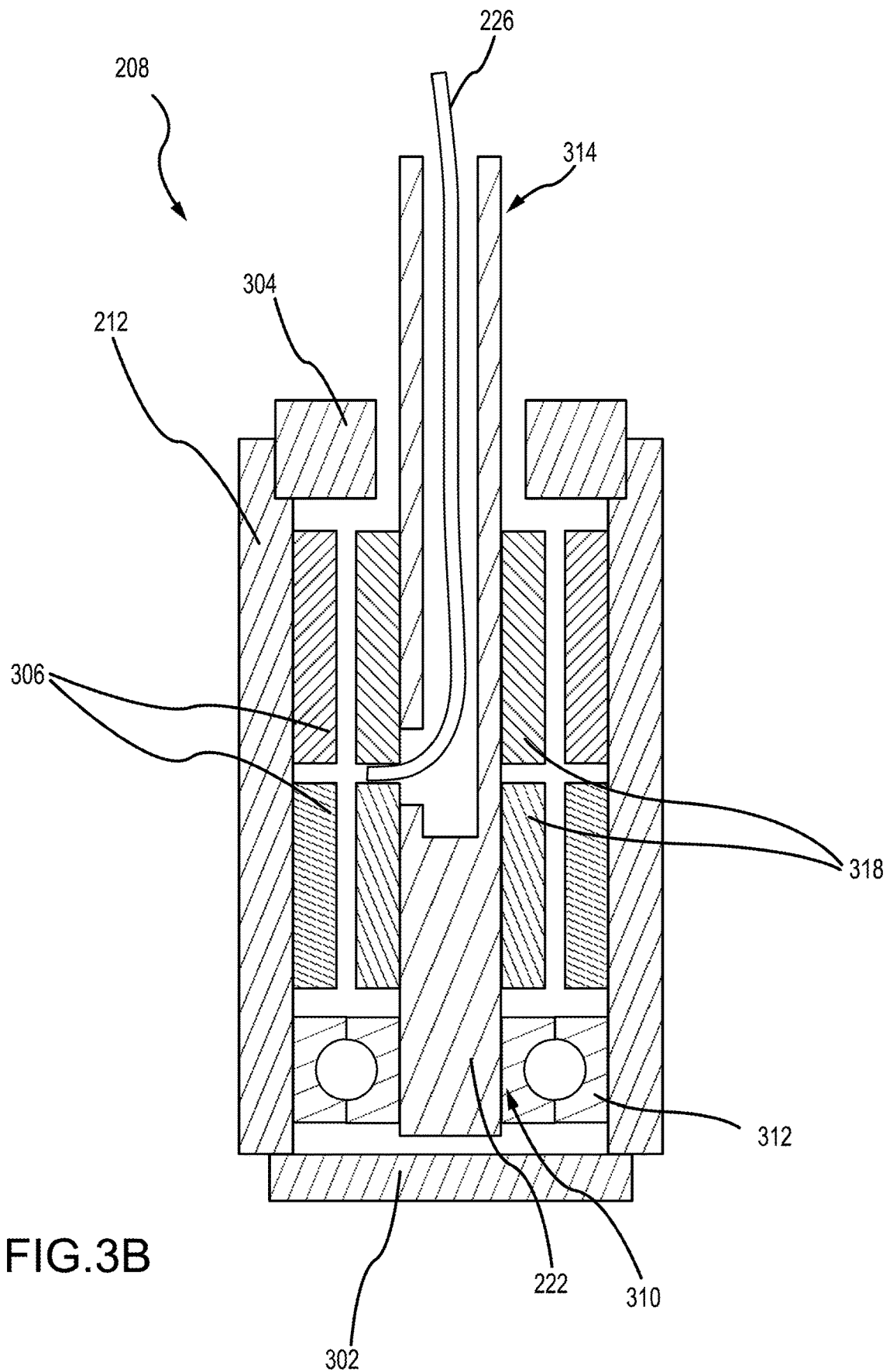
FIG. 3B illustrates a cross section view of a rotor assembly with an integrated position sensor of a brushless motor, in accordance with various embodiments.

FIG. 3A illustrates a cross section view of a brushless motor 200, in accordance with various embodiments. FIG. 3B illustrates a cross section view of a rotor assembly 208 with an integrated position sensor of the brushless motor 200, which in accordance with various embodiments. In various embodiments, in order to reduce the overall length of the brushless motor 200 in the y-direction, the rotor assembly 208 is configured to be a hollow housing defining a void. In various embodiments, the hollow housing of the rotor assembly 208 may be generated by forming a cylinder with a closed end 302 that couples to a first portion 218 of motor shaft 204 and a partially closed end 304 that couples to a second portion 220 of the motor shaft 204, which, in various embodiments, may be a tube structure. In that regard, in various embodiments, the motor shaft 204 includes the first portion 218 and the second portion 220 with the rotor assembly 208 disposed between the first portion 218 and the second portion 220. In various embodiments, the first portion 218 of the motor shaft 204 is configured to rotate within the first bearing 214a and the second portion 220 of the motor shaft 204 is configured to rotate within the second bearing 214b.

In various embodiments, the rotor assembly 208 includes a set of rotating position sensor windings 306 positioned within and coupled to an inside diameter of the hollow housing of the rotor assembly 208. In that regard, in various embodiments, the set of rotating position sensor windings 306 is configured to rotate with the rotor assembly 208. In various embodiments, the rotor assembly 208 includes a hollow stationary position sensor shaft 222. In various embodiments, a first end 310 of the hollow stationary position sensor shaft 222 is configured to be positioned within a position sensor bearing 312 that is coupled to the rotor assembly 208. In that regard, responsive to the rotor assembly 208 rotating, the position sensor bearing 312 rotates around the first end 310 of the hollow stationary position sensor shaft 222. In various embodiments, the second end 314 of the hollow stationary position sensor shaft 222 protrudes through the partially closed end 304 of the rotor assembly 208 and couples to end plate 224 of the motor housing 202.

In various embodiments, a set of stationary position sensor windings 318 are coupled to an outside diameter of the hollow stationary position sensor shaft 222. In various embodiments, communication leads 226 from the set of stationary position sensor windings 318 are routed through the hollow stationary position sensor shaft 222 and out the second end 314 of the hollow stationary position sensor shaft 222 to provide rotor position feedback. In various embodiments, a position of the hollow stationary position sensor shaft 222 within the rotor assembly 208 may be 'tuned' by adjusting the end plate 224 of the motor housing 202 to which the second end 314 of the hollow stationary position sensor shaft 222 is coupled relative to the stator assembly 206 angularly until a desired alignment has been reached, followed by fixing the end plate 224 of the motor housing 202 in this position. In various embodiments, the illustrated position sensor may be substituted with any other type of rotary position sensor, i.e. a variable reluctance resolver, an optical encoder, a Hall effect position sensor, or Hall effect position encoder, among others, which may be packaged inside the rotor assembly 208.

Accordingly, in various embodiments, the length of the brushless motor is reduced by relocating the position sensor inside of the brushless motor's rotor core. Accordingly, in various embodiments, by relocating the position sensor inside of the brushless motor's rotor core, motor length may be reduced as well as motor weight. By reducing the motor length and weight, a favorable reduction in packaging space may be realized. Furthermore, a brushless motor that has the position sensor relocated within the rotor core provides dimensions identical to those of a brushless motor with no position sensor, while maintaining the motor's ability of providing rotor position feedback and associated performance improvements.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially." "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brushless motor with integrated position sensor, comprising:
   a motor housing;
   a stator assembly positioned on an inside outer circumference of the motor housing;
   a rotor assembly positioned within and surrounded by the stator assembly; and
   a position sensor integrated within the rotor assembly, wherein the rotor assembly comprises a hollow housing defining a void in which the position sensor is located, wherein the position sensor comprises a set of rotating position sensor windings positioned within and coupled to an inside diameter of the hollow housing of the rotor assembly, and wherein the position sensor comprises a stationary position sensor shaft positioned within and surrounded by the set of rotating position sensor windings.

2. The brushless motor of claim 1, wherein the set of rotating position sensor windings rotate with the rotor assembly.

3. The brushless motor of claim 1, wherein the position sensor comprises a set of stationary position sensor windings coupled to an outside diameter of the stationary position sensor shaft.

4. The brushless motor of claim 3, wherein the stationary position sensor shaft is hollow and wherein communication leads from the set of stationary position sensor windings are routed through the hollow portion of the stationary position sensor shaft in order to provide rotor position feedback.

5. The brushless motor of claim 1, wherein a first end of the stationary position sensor shaft is configured to be positioned within a position sensor bearing, wherein the position sensor bearing rotates with the rotor assembly and around the first end of the stationary position sensor shaft.

6. The brushless motor of claim 1, wherein a second end of the stationary position sensor shaft protrudes through a partially closed end of the rotor assembly and couples to an end plate of the motor housing.

7. The brushless motor of claim 6, wherein the stationary position sensor shaft may be tuned by adjusting the end plate of the motor housing.

8. A brake assembly, the brake assembly comprising:
   a plurality of rotating discs;
   a plurality of stators, each of the plurality of stators positioned between two of the plurality of rotating discs;
   a pressure plate configured to apply pressure forcing the plurality of rotating discs and the plurality of stators together; and
   a brushless motor configured to apply a pressure to the pressure plate so that the pressure plate forces the plurality of rotating discs and the plurality of stators together, wherein the brushless motor comprises:
   a motor housing;
   a stator assembly positioned on an inside outer circumference of the motor housing;
   a rotor assembly positioned within and surrounded by the stator assembly; and
   a position sensor integrated within the rotor assembly, wherein the rotor assembly comprises a hollow housing defining a void in which the position sensor is located, wherein the position sensor comprises a set of rotating position sensor windings positioned within and coupled to an inside diameter of the hollow housing of the rotor assembly, and wherein the position sensor comprises a stationary position sensor shaft positioned within and surrounded by the set of rotating position sensor windings.

9. The brake assembly of claim 8, wherein the set of rotating position sensor windings rotate with the rotor assembly.

10. The brake assembly of claim 8, wherein the position sensor comprises a set of stationary position sensor windings coupled to an outside diameter of the stationary position sensor shaft.

11. The brake assembly of claim 10, wherein the stationary position sensor shaft is hollow and wherein communication leads from the set of stationary position sensor windings are routed through the hollow portion of the stationary position sensor shaft in order to provide rotor position feedback.

12. The brake assembly of claim 8, wherein a first end of the stationary position sensor shaft is configured to be positioned within a position sensor bearing, wherein the position sensor bearing rotates with the rotor assembly and around the first end of the stationary position sensor shaft.

13. The brake assembly of claim 8, wherein a second end of the stationary position sensor shaft protrudes through a partially closed end of the rotor assembly and couples to an end plate of the motor housing.

14. The brake assembly of claim 13, wherein the stationary position sensor shaft may be tuned by adjusting the end plate of the motor housing.

15. An aircraft comprising:
a brake assembly, the brake assembly comprising:
- a plurality of rotating discs;
- a plurality of stators, each of the plurality of stators positioned between two of the plurality of rotating discs;
- a pressure plate configured to apply pressure forcing the plurality of rotating discs and the plurality of stators together; and
- a brushless motor configured to apply a pressure to the pressure plate so that the pressure plate forces the plurality of rotating discs and the plurality of stators together, wherein the brushless motor comprises:
    - a motor housing;
    - a stator assembly positioned on an inside outer circumference of the motor housing;
    - a rotor assembly positioned within and surrounded by the stator assembly; and
    - a position sensor integrated within the rotor assembly, wherein the rotor assembly comprises a hollow housing defining a void in which the position sensor is located, wherein the position sensor comprises a set of rotating position sensor windings positioned within and coupled to an inside diameter of the hollow housing of the rotor assembly, and wherein the position sensor comprises a stationary position sensor shaft positioned within and surrounded by the set of rotating position sensor windings.

* * * * *